United States Patent
Foucher et al.

[11] Patent Number: 5,969,003
[45] Date of Patent: Oct. 19, 1999

[54] INK COMPOSITIONS

[75] Inventors: Daniel A. Foucher, Toronto; Guerino G. Sacripante, Oakville; Raymond W. Wong; Marcel P. Breton, both of Mississauga, all of Canada

[73] Assignee: Xerox Corporation, Stamford, Conn.

[21] Appl. No.: 09/017,537

[22] Filed: Feb. 2, 1998

[51] Int. Cl.$^6$ .............. C09D 11/02; C08F 20/38; C08G 63/688; C08G 63/78

[52] U.S. Cl. .............. 523/160; 525/35; 525/41; 525/445; 106/31.27; 106/31.28; 106/31.6; 106/31.65

[58] Field of Search .............. 523/160, 161; 525/445, 35, 41; 106/31.27, 31.28, 31.29, 31.6, 31.61, 31.65

[56] References Cited

U.S. PATENT DOCUMENTS

| | | | |
|---|---|---|---|
| 4,251,824 | 2/1981 | Hara et al. | 346/140 R |
| 4,463,359 | 7/1984 | Ayata et al. | 346/1.1 |
| 4,532,530 | 7/1985 | Hawkins | 346/140 R |
| 4,597,794 | 7/1986 | Ohta et al. | 106/20 |
| 4,601,777 | 7/1986 | Hawkins et al. | 156/326 |
| 4,627,875 | 12/1986 | Kobayashi et al. | 106/22 |
| 4,659,383 | 4/1987 | Lin et al. | 106/27 |
| 4,689,488 | 8/1987 | Beziers | 250/492.3 |
| 4,705,567 | 11/1987 | Hair et al. | 106/20 |
| 4,737,190 | 4/1988 | Shimada et al. | 106/22 |
| 4,840,674 | 6/1989 | Schwarz | 106/22 |
| 4,853,036 | 8/1989 | Koike et al. | 106/20 |
| 4,877,451 | 10/1989 | Winnik et al. | 106/23 |
| 5,021,802 | 6/1991 | Allred | 346/1.1 |
| 5,041,161 | 8/1991 | Cooke et al. | 106/22 |
| 5,043,084 | 8/1991 | Gutierrez et al. | 252/47 |
| 5,065,167 | 11/1991 | You et al. | 346/1.1 |
| 5,079,282 | 1/1992 | Okuda | 524/91 |
| 5,124,718 | 6/1992 | Koike et al. | 346/1.1 |
| 5,156,675 | 10/1992 | Breton et al. | 106/22 |
| 5,169,437 | 12/1992 | You | 106/20 D |
| 5,207,824 | 5/1993 | Moffatt et al. | 106/22 R |
| 5,213,614 | 5/1993 | Eida et al. | 106/31.52 |
| 5,324,349 | 6/1994 | Sano et al. | 106/25 R |
| 5,342,724 | 8/1994 | Wilson | 430/114 |
| 5,344,872 | 9/1994 | Debord et al. | 524/513 |
| 5,348,832 | 9/1994 | Sacripante et al. | 430/109 |
| 5,364,462 | 11/1994 | Crystal et al. | 106/22 R |
| 5,389,131 | 2/1995 | Colt et al. | 106/31.43 |
| 5,441,561 | 8/1995 | Chujo et al. | 106/31.28 |
| 5,529,617 | 6/1996 | Yamashita et al. | 106/31.58 |
| 5,531,818 | 7/1996 | Lin et al. | 106/31.28 |
| 5,604,076 | 2/1997 | Patel et al. | 430/137 |
| 5,626,655 | 5/1997 | Pawlowski et al. | 106/31.27 |
| 5,648,193 | 7/1997 | Patel et al. | 430/137 |
| 5,658,704 | 8/1997 | Patel et al. | 430/137 |
| 5,679,724 | 10/1997 | Sacripante et al. | 523/161 |
| 5,684,063 | 11/1997 | Patel et al. | 523/161 |
| 5,690,721 | 11/1997 | Itoh | 106/31.13 |
| 5,762,695 | 6/1998 | Wong et al. | 106/31.89 |
| 5,772,746 | 6/1998 | Sawada et al. | 106/31.86 |
| 5,821,276 | 10/1998 | Duncan | 522/20 |
| 5,833,744 | 11/1998 | Breton et al. | 106/31.59 |
| 5,851,274 | 12/1998 | Lin | 106/31.43 |

OTHER PUBLICATIONS

Barton, Kenneth R., "Sulfopolyesters: New Resins for Water-Based Inks, Overprint Laquers and Primers", American Ink Maker, Oct. (pp. 70–22).

*Primary Examiner*—Vasu Jagannathan
*Assistant Examiner*—Callie E. Shoshu
*Attorney, Agent, or Firm*—E. O. Palazzo

[57] ABSTRACT

An ink that contains a vehicle, a colorant and a sulphonated polyester terminated with acrylic acid groups, methacrylic acid groups, or mixture thereof.

30 Claims, No Drawings

INK COMPOSITIONS

BACKGROUND OF THE INVENTION

This invention relates to ink jet inks, and more specifically, to improved inks that enable developed images with minimal, or reduced smear, and excellent optical densities, and which inks contain polymers of for example, block copolymers of linear sulfonated polyester and acrylic acid segments, and which polymers preferably possesses a $M_w$ of greater than about, or equal to about 3,000, for example from about 3,000 to about 10,000, a $M_n$ of greater than about, or equal to about 1,500, for example from about 1,500 to about 7,000, and a glass transition temperature of greater than about, or equal to about 20 degrees Centigrade, for example from about 30 to about 75 degrees Centigrade. The invention inks can be selected for use in ink jet printing processes, including printing processes such as thermal ink jet and piezoelectric or acoustic ink jet processes, and wherein there is provided, for example, archival print quality comparable to that obtained in xerographic dry toner development systems. With the inks of the present invention there are enabled a number of advantages, such as extended ink stability, excellent developed images and prints, high optical densities, and the like.

PATENT AND PENDING APPLICATIONS

The following applications, the disclosures of each being totally incorporated herein by reference, are being filed concurrently herewith.

U.S. Ser. No. 09/017,533 relating to an aqueous ink containing a dissipatible polymer, colorant and a zwitterionic component like betaine;

U.S. Ser. No. 09/017,459 relating to an ink containing a colorant, polymer, such as a dissipatible polymer, vehicle, and a salt of polyacrylic, a salt of polyamic acid, a salt of alginic acid, or mixtures thereof;

U.S. Ser. No. 09/017,537 relating to an ink containing a resin of a dissipatible sulfonated polyester terminated with acrylic or methacrylic acid groups;

U.S. Ser. No. 09/017,072 relating to an ink containing a mixture of two black colorants, betaine, and N,N'-bis(3-aminopropyl) ethylenediamine; and U.S. Pat. No. 5,863,320 relating to an ink containing a perfluoro surfactant additive.

The appropriate components and processes of the above applications may be selected for the present invention in embodiments thereof.

Illustrated in U.S. Pat. No. 5,679,724 and copending applications U.S. Ser. No. 560,783 and U.S. Ser. No. 380,550 are ink jet inks wherein the resin and pigment, or colorant are not believed to be separated, and in U.S. Ser. No. 828,850 inks where the colorant and resin are separated. The disclosures of each of these applications are totally incorporated herein by reference.

PRIOR ART

Ink jet printing processes and apparatus for such processes are known. Major ink jet processes can be classified as thermal ink jet and acoustic or piezoelectric ink jet processes.

In thermal ink jet printing processes, the printer usually utilizes a resistor element in a chamber provided with an opening for ink to enter and from a plenum. The plenum is connected to a reservoir for storing the ink. A plurality of such resistor elements is generally arranged in a particular pattern in a printhead. Each resistor element is associated with a nozzle through which ink is expelled toward a print medium, such as paper. In operation, each resistor element is connected by a conductive trace to a microprocessor, where current-carrying signals cause one or more selected elements to heat up. The heating creates a bubble of ink vapor in the chamber, which in turn expels a droplet of ink through the nozzle toward the print medium. In this manner, the firing of a plurality of such resistor elements in a particular order forms alpha numeric characters, performs area fill, and provides other print capabilities on the medium. The thermal ink jet printing process is described in more detail, for example, in U.S. Pat. Nos. 5,169,437 and 5,207,824, the entire disclosures of each of these patents being totally incorporated herein by reference.

In an acoustic or piezoelectric ink jet system, ink droplets are propelled to the recording medium by means of a piezoelectric oscillator. In such a system, a recording signal is applied to a recording head containing the piezoelectric oscillator causing droplets of the ink to be generated and subsequently expelled through the printhead in response to the recording signal to generate an image on the recording medium. In this printing system, a recording signal is converted into a pulse by a signal processing means, such as a pulse converter and then applied to the piezoelectric oscillator. A change in pressure on the ink within an ink chamber in the printhead caused by the recording signal results in droplets of ink being ejected through an orifice to a recording medium. This type of ink jet system is described in more detail, for example, in U.S. Pat. No. 4,627,875, the entire disclosure of which is incorporated herein by reference.

A related printing method is the impulse, or drop-on-demand, ink jet printing process. Impulse ink jet printing processes generally use a hot melt ink jet ink. For example, in the impulse printing process, the hot melt ink is heated into a fluid phase and is caused to form a convex meniscus at the printhead nozzle tip by hydrostatic pressure. This pressure causes the end of the ink bubble to intrude into an electrostatic field. The ink is then electrostatically drawn into a single file stream of drops that traverse the span between the tip of the nozzle and the carrier (paper). Impulse printing processes, and hot melt inks for use therein are described, for example, in U.S. Pat. No. 4,659,383, the entire disclosure of which is incorporated herein by reference. A disadvantage of the impulse printing processes, however, is that the resultant print image can possess a waxy texture and appearance, sometimes referred to as crayoning, and which may smear when abraded due to the presence of wax in the hot melt ink jet ink. The resultant print image thus generally has a lower archival quality.

In these and other ink jet recording processes, it can be important that the ink being used satisfies various performance characteristics. These performance characteristics are generally more stringent than those for other liquid ink applications, such as for writing instruments, like a fountain pen, felt pen, and the like. In particular, some or all of the following are generally desired for inks utilized in ink jet printing processes:

(1) the ink should possess liquid properties, such as viscosity, surface tension and electric conductivity, optimized for the discharging conditions of the printing apparatus, such as the thermal ink jet heater temperature increase;

(2) the ink should be capable of being stored in the ink jet device for an extended period of time between cycles without causing clogging of the printhead orifices during use. In a very stressful situation the device should be able to remain uncapped for hours or days and still be able to recover all jets when operated;

(3) the recording liquid should be quickly fixable onto recording media, such as paper, film, and the like to permit the outlines of the resulting ink dots to be smooth, and wherein there is minimal smearing of the printed image;

(4) the resultant ink image should be of high quality, such as having a clear color tone and high optical density. The ink image should also have a large color gamut ideally, equal to or better than that obtained with laser xerographic printers;

(5) the resultant ink image should exhibit excellent waterfastness (water resistance) and lightfastness (light resistance);

(6) the ink should not chemically attack, corrode or erode surrounding components, such as the ink storage container, printhead components, orifices, and the like;

(7) the ink should not possess an unpleasant odor and should not be toxic or flammable; and (8) the ink should exhibit low foaming and good shelf life stability characteristics for properties such as particle growth, viscosity creep, pH stability, and the like.

Various inks for ink jet printing processes are known. For example, various ink jet inks are disclosed in U.S. Pat. Nos. 4,737,190 and 5,156,675. Generally, the ink jet inks of the prior art are aqueous inks, comprising a major amount of water, a humectant and/or a co-solvent, and colorant. By selecting specific components such as humectants, colorants, or other components, adjustment of the print characteristics of the resultant ink can be achievable in some instances. Also, illustrated in U.S. Pat. No. 5,324,349 are ink jet inks with saccharides and polyols, and wherein the resin and pigment are associated with, or in contact with each other, causing undesirable ink stability and other disadvantages.

Various xerographic imaging methods utilizing a black or colored dry toner composition provide images and prints with very high quality. These images and prints generally have high fix, smear resistance, and excellent waterfastness and lightfastness, and thus these imaging methods are selected for archival quality images and prints. These high archival qualities are generally not obtainable using ink jet printing processes. However, the ink jet printing processes possess an advantage over the xerographic imaging processes in that the process and apparatus used in an ink jet printing process are generally less costly and less cumbersome. For example, both the material and operating costs of an ink jet printing process are generally less costly than for a dry xerographic development process.

Ink jet printing systems, and particularly thermal ink jet printing systems possess a number of print quality disadvantages as compared to xerographic development systems employing polymer resin dry based toners. These disadvantages include the following:

(1) Lack of 100 percent waterfastness in black and color inks. Although advances have recently been made to improve waterfastness, many of the ink jet ink compositions do not consistently achieve 100 percent waterfastness, and therefore are subject to smearing, line blooming, or other problems in high humidity atmospheres, and the blending or diluting of colors when prints contact water.

(2) Poor edge sharpness. It is important that the developed images exhibit high edge acuity, being sharp rather than ragged. Although some printers have addressed this problem by incorporating multipass printing and elaborate pixel management algorithms and/or heating of the imaging substrate, some edge raggedness can exist with dye based color inks used in these printing systems.

(3) Inter-color bleed. Water-based ink jet printing processes possess in many instances inter-color bleed; that is the bleeding of color from one freshly printed area into another at a boundary line before the water-based inks dry. This is noticeable to the human eye, for example, when black text is printed on a yellow highlight background. Since the inter-color bleed occurs in much less than one second after printing, usually cannot be eliminated by drying the imaging substrate after printing has occurred.

(4) Minimal saturation in colors on plain paper. In ink jet printing processes, the highest quality prints have generally been obtained by printing on specially designed coated papers. However, when standard uncoated papers are used, without heating of the paper before or during printing, the color saturation is lower, resulting in less acceptable prints.

(5) Show through. One primary reason for the reduced print quality of water based ink jet printing processes is that the colorant penetrates further into the surface of absorbent imaging substrates, such as paper. A direct result of the increased penetration into the paper surface is the problem known as show through, that is the increased visibility, relative to xerographic prints, of the image from the back side of the paper. In addition to being objectionable in itself to some users, the show through problem also severely limits the possibility for duplex printing using ink jet inks on such papers.

(6) Paper latitude. Ink jet printing processes using water-based ink generally exhibit a smaller paper latitude as compared to xerographic imaging processes. For example, in printing processes that use only ambient temperature drying, the paper latitude is poor.

Of recent high importance is the stability of the ink, for example ink jet inks can destabilize over a period of time, such as two days, and therefore cannot usually be effectively used to obtain smudgeproof images, and in many instances the ink jet ink may be unusable. These and other disadvantages are alleviated with the present invention in embodiments thereof. Also, there is a need for stable ink jet compositions that satisfy, or minimize a number of the above described functional requirements such as, (1) to (6), while simultaneously providing high print quality prints with archival properties on a wide variety of recording media, including plain paper, transparencies and cloth.

SUMMARY OF THE INVENTION

The present invention provides in embodiments stable ink jet ink compositions that provide high print quality and archival properties on a wide variety of print media, including paper, transparencies and cloth. The ink compositions of the present invention satisfy, it is believed, a number of the various end-user requirements illustrated herein, including a wide color gamut, excellent waterfastness, and excellent lightfastness equal to for example, dry xerographic prints, superior storage stability, low odor and minimum toxicity, reduced smear, and excellent optical density.

The present invention relates to:

an ink composition comprised of (a) an ink vehicle, (b) a resin of a sulfonated polyester terminated with acrylic groups or methacrylic acid groups and which resin can function to reduce image smear, and which resin can be considered a low smear additive, and (c) colorant; an ink composition wherein the colorant is a pigment; an ink composition wherein the colorant is a dye; an ink composition wherein the resin $M_w$ is from about 2,000 to about 10,000 daltons, the resin $M_n$ is from about 1,500 daltons to about 7,000 daltons, and the resin Tg is from about 0 to about 70° C.; an ink composition wherein the resin $M_w$ is from about 2,500 to about 7,000 daltons, the resin $M_n$ is from about 2,000 to about 5,000 daltons, and the resin Tg is from about 30 to about 60 degrees Centigrade; an ink composition wherein the resin is a diblock copolymer of copoly(1,2-propylene-diethylene)terephthalate-copoly (sodium sulphoisophthalate dicarboxylate)-copolyacrylic acid or copolymethacrylic acid-copoly(1,2-propylene-diethylene)terephthalate-copoly(sodium sulphoisophthalate dicarboxylate)-copolyacrylic acid with a degree of sulphonation of from about 2.5 to about 10 mol percent based on the repeat unit of the sulphonated polyester; an ink composition wherein the resin is copolyacrylicacid copoly(1,2-propylene-diethylene)terephthalate-copoly(sodium sulphoisophthalate dicarboxylate)-copolyacrylic acid or copolymethacrylic acid copoly(1,2-propylene-diethylene) terephthalate-copoly(sodium sulphoisophthalate dicarboxylate)-copolymethacrylic acid with a number average molecular weight of from about 1,500 to about 7,000 daltons and a weight average molecular weight from about 2,000 to about 10,000 daltons, a resin glass transition of from about 10 to about 70° C., and which resin possesses a degree of sulphonation between about 2.5 and 10 mol percent based on the repeat unit of the polymer; an ink composition wherein the volume average resin particles size is from about 0.025 microns to about 2 microns; an ink composition wherein the ink vehicle is selected from the group consisting of water, ethylene glycol, propylene glycol, diethylene glycol, triethylene glycol, thioglycol, glycerine, dipropylene glycol, polyethylene glycol, and polypropylene glycol; amides of urea and substituted ureas; ethers of ethylene glycolmonomethyl ether, ethylene glycolmonoethyl ether, diethylene glycolmonomethyl ether, diethylene glycolmonoethyl ether, diethylene glycolmonobutyl ether, propylene glycolmonomethyl ether, propylene glycolmonomethyl ether, propylene glycolmonobutyl ether, triethylene glycol ether, tripropylene glycol monomethyl ether; carboxylic acids and their salts; esters; alcohols of ethyl alcohol, isopropyl alcohol, butyl alcohol, and benzyl alcohol; organosulfides, organosulfoxides, sulfones, alcohol derivatives, carbitol, butyl carbitol, cellusolve, ether derivatives, amino alcohols, ketones, 1,3-dimethylimidizalidinone, N-methyl-2-pyrrolidinone, 2-pyrrolidone, cyclohexyl-pyrrolidone, hydroxyethers, amides, sulfoxides, lactones; and mixtures thereof; an ink composition wherein the colorant is present in an amount of from about 1 to about 15 weight percent; an ink composition wherein the colorant is carbon black; an ink composition wherein the carbon black is dispersed by an ionic component, or a polymeric dispersant, or the carbon black is self dispersing by the covalently binding of suspending groups to the carbon black surface; an ink composition wherein the colorant is a cyan pigment, a magenta pigment, a yellow pigment, a red pigment, a blue pigment, dyes thereof, or mixtures thereof; an ink composition with a viscosity of from about 1.5 to about 5 centipoise, and a surface tension of from about 30 to about 55 dynes per centimeter; an ink composition further containing ink additives; an ink composition with ink additives selected from the group consisting of biocides, buffering agents, anti-mold agents, pH adjustment agents, electric conductivity adjustment agents, chelating agents, anti-rusting agents, anti-cockle agents, and stabilizing agents, and which components are each selected in an amount of from about 0.01 to about 10 weight percent; an ink composition wherein the buffering agents are sodium borate, sodium hydrogen phosphate, sodium dihydrogen phosphate, or mixtures thereof; said biocides are benzoate salts, sorbate salts, or mixtures thereof; said pH controlling agents are acids, bases of hydroxides of alkali metals of lithium hydroxide; phosphate salts; carbonate salts; carboxylate salts; sulfite salts; amine salts; amines of diethanolamine, and triethanolamine; and mixtures thereof; said anticurl agents are trimethylolpropane, N-acetylethanolamine, N-N-diacetyl piperazine, triethylene glycol, N-(2-aminoethyl) ethanolamine, 1,4-butanediol, N-ethylformamide, 2-methyl-1,5-pentanediol, 1,5-pentanediol, diethylene glycol, 2,2'-oxybisethanol, and mixtures thereof; the chelating agents are ethylenediaminetetraacetic acid, and salts thereof; the stabilizing agents are polyethylene oxide/bisphenol A polymer; or external salts of quaternary ammonium halide salts of ammonium chloride, ammonium bromide or lithium chloride; a process for the preparation of ink compositions which comprises mixing of sulforated polyester resin, colorant, and vehicle; an ink jet recording process comprising ejecting in the form of ink droplets the invention ink from an orifice in accordance with a recording signal to form an image on a recording medium; a process wherein the fixing of the image is by air drying, heat drying, microwave drying, vacuum drying, radiant fusing, or pressure fusing; an ink wherein the sulfurated polyester resin is present in an amount of from about 1 to about 5 weight percent or parts, the vehicle is present in an amount of form about 80 to about 90 weight percent or parts, and the colorant is present in an amount of form about 5 to about 15 weight percent, and subject to the provision that the total of said ink components is about 100 percent; an ink composition wherein the polyester resin is a triblock polymer of copolyacrylic acid copoly(1,2-propylene-diethylene)terephthalate-copoly(sodium sulphoisophthalate dicarboxylate)-copolyacrylic acid or copolymethacrylic acid copoly(1,2-propylene-diethylene) terephthalate-copoly(sodium sulphoisophthalate dicarboxylate)-copolymethacrylic acid with a degree of sulphonation of from about 2.5 to about 10 mol percent based on the repeat unit of the sulphonated polyester; and an ink comprised of a vehicle, a sulfonated polyester with acrylic acid groups, methacrylic acid groups, or mixtures thereof.

In the present invention in embodiments thereof, there is provided an ink comprised of a vehicle, such as water, colorant, such as a dye, pigment, or mixtures thereof, and a polymer, such as a sulfonated polyester terminated with an acrylic acid end groups or methoacrylic acid end groups. The aforementioned polymer is for example, preferably of a low molecular weight and is soluble or dispersible in the ink vehicle, and wherein the polymer, or resin is preferably a diblock, or triblock polymer.

Examples of polymers selected in various effective amounts, such as for example, from about 1 to about 10, and preferably from about 2 to about 5 weight percent based on the total amount of all ink components, which should equal about 100 percent, or 100 parts, include sulfonated polyesters terminated with acrylic acid end groups, and more specifically wherein there are selected linear diblock copolymers such as copoly(1,2-propylene-diethylene) terephthalate-copoly(sodium sulphoisophthalate dicarboxylate)-copolyacrylic acid, copolymethacrylic acid-copoly(1,2-propylene-diethylene)terephthalate-copoly(sod ium sulphoisophthalate dicarboxylate)-copolyacrylic acid or preferably triblock polymers such as copolyacrylic acid-copoly(1,2-propylene-diethylene)terephthalate-copoly (sodium sulphoisophthalate dicarboxylate)-copolyacrylic acid or copolymethacrylic acid-copoly(1,2-propylene-diethylene)terephthalate-copoly(sodium sulphoisophthalate dicarboxylate)-copolymethacrylic acid with a weight average, $M_w$ molecular weight of for example from about 1,000 to about 15,000 daltons and preferably between about 3,000 and about 8,000 daltons and a number average molecular weight ($M_n$) of for example between about 500 and about 10,000 daltons measured using a Waters Gel Permeation Chromatography (GPC) system and preferably from about 1,500 and about 5,000 and polymer glass transition temperatures values of for example from about 10 to about 60° C. measured using a Thermal Analyst Model 2220 DSC-10 Differential Scanning Calorimeter from DuPont.

Excellent yields of polymer, for example greater than about 80 percent, and more specifically from about 80 to about 95 percent can be obtained with a number of suitable processes, and more specifically by a process which comprises the following:

(1) the synthesis of the sulphonated polyester resin, or polymer additive by a condensation polymerization involving first the transesterification of one or more of a diester or diacid, for example from about 0.400 to about 0.475 mol percent dimethylterephthalate and dimethylsulphoisophthalate, in the presence of excess glycols or mixture of glycols such as 1,2-propanediol and diethylene glycol, to eliminate either methanol or water, followed by a condensation to remove excess glycols and increase molecular weight. The isolated polymer can be comprised on a final mol percent basis of between about 0.400 and about 0.475 mol of terephthalate dicarboxylate about, 0.100 and 0.025 mol of sulphoisophthalate dicarboxylate about, 0.400 and 0.500 mol of 1,2-propylene and between about 0.100 and about 0 mol percent of diethylene;

(2) modification of the terminus of the polymers from hydroxyl or carboxylate end groups to vinyl acrylic moieties by reaction with from about to about 5 mol percent of maleic anhydride based on the sulphonated polyester, for example 9 grams of maleic anhydride to 300 grams of the sulphonated polymer, and preferably between about 2 to about 3 mol % of maleic anhydride, in the melt (150 to 175° C.) for between 15 and 60 minutes and preferably between 20 and 40 minutes; and (3) free radical polymerization by heating for example, at about 70° C. of one part of the acrylic acid terminated sulphonated polyester with a suitable amount for example, about one part of an acrylic monomer, a methacrylic monomer, or other suitable vinyl monomer such as poly(ethylene glycol) ethyl ether methacrylate and which is capable of forming di or triblock polymers in a preferred solvent such as tetrahydrofuran (THF), a suitable free radical initiator, such as Vazo 52 (2,2'-azobis(2,4-dimethylvaleronitrile from E. I. DuPont) in an amount of about 0.1 to 1 weight percent, and between about 1 to about 5, and preferably from about 2 to about 3 weight percent of a known chain transfer agent such as dodecanethiol, followed by recovery of the polymer product by precipitation into a non-solvent, such as methanol or hexanes, employed in an amount of about 40:1 non-solvent to polymer excess to ensure the removal of impurities and unreacted products, for example 10 grams of the product copolyacrylicacidcopoly(1,2-propylene-diethylene) terephthalate-copoly(sodium sulphoisophthalate dicarboxylate)-copolyacrylic acid polymer solution was precipitated into 400 g of methanol, followed by filtration, solution of the product and vacuum drying to remove traces of solvent.

The inks usually contain a vehicle, or dispersing medium, for example water present in amounts of typically from for example, about 40 to about 90, and preferably from about 80 to about 90 weight percent, and providing the total of all ink components is equal to about 100 percent, or 100 parts. The ink vehicle can be selected from the group consisting of aliphatic glycols, such as ethylene glycol, propylene glycol, diethylene glycols, triethylene glycols, thioglycol, glycerine, dipropylene glycols, polyethylene glycols, and polypropylene glycols; amides such as urea and substituted ureas; ethers such as ethylene glycolmonomethyl ether, ethylene glycolmonoethyl ether, diethylene glycolmonomethyl ether, diethylene glycolmonoethyl ether, diethylene glycolmonobutyl ether, propylene glycolmonomethyl ether, propylene glycolmonomethyl ether, propylene glycolmonobutyl ether, triethylene glycol ether, tripropylene glycol monomethyl ether, carboxylic acids and their salts; esters; alcohols such as ethyl alcohol, isopropyl alcohol, butyl alcohol, and benzyl alcohol, organosulfides, organosulfoxides, sulfones, alcohol derivatives, carbitol, butyl carbitol, cellusolve, ether derivatives, amino alcohols, ketones, 1,3-dimethylimidizalidinone, N-methyl-2-pyrrolidinone, 2-pyrrolidone, cyclohexyl-pyrrolidone, hydroxyethers, amides, sulfoxides, lactones, and mixtures thereof.

The liquid vehicle of the inks of the present invention may be comprised of water, or water and a miscible organic component, or cosolvent. Examples of suitable cosolvents include, but are not limited to glycols, such as ethylene glycol, propylene glycol, diethylene glycols, triethylene glycols, thioglycol, glycerine, dipropylene glycols, polyethylene glycols, polypropylene glycols, amides such as urea and substituted ureas, ethers such as ethylene glycolmonomethyl ether, ethylene glycolmonoethyl ether, diethylene glycolmonomethyl ether, diethylene glycolmonoethyl ether, diethylene glycolmonobutyl ether, propylene glycolmonomethyl ether, propylene glycolmonomethyl ether, propylene glycolmonobutyl ether, triethylene glycol ether, tripropylene glycol monomethyl ether, carboxylic acids and their salts, esters, alcohols such as ethyl alcohol, isopropyl alcohol, butyl alcohol, and benzyl alcohol, organosulfides, organosulfoxides, sulfones such as Sulfolane, alcohol derivatives, carbitol, butyl carbitol, cellusolve, ether derivatives, amino alcohols, ketones, N-methylpyrrolidinone, 2-pyrrolidone, cyclohexyl-pyrrolidone, hydroxyethers, amides, sulfoxides such as dimethyl sulfoxide, lactones, mixtures thereof and the like.

When mixtures of water and one or more cosolvents or codispersants are selected as the liquid vehicle, the ratio of water to cosolvent may be in any effective range. Typically, the ratio of water to cosolvent is from about 100:0 to about 20:70, and preferably from about 97:3 to about 50:50, although other suitable ratios may be selected. The nonwater component of the liquid vehicle, when present, generally functions as a humectant, which typically has a boiling point higher than that of water. For example, suitable humectants include, but are not limited to glycols, N-methyl-pyrrolidone, 2-pyrrolidone, N-methyl-2-pyrrolidone, 1,2-dimethyl-2-imidazolidinone, Sulfolane, mixtures thereof and the like. Humectants may be included in the ink to prevent water evaporation and sedimentation. Additionally, certain humectants, such as N-methyl-pyrrolidone and 2-pyrrolidone, have been found to improve jetting performance in the ink and thus serve the dual function as a humectant and as a cosolvent. Further, some humectants, such as 2-pyrrolidone resist ink, build up on jet faces during extended printing, and which resistance is preferred for cartridge refillability.

The colorant can be a pigment dye, or mixture thereof present for example in an amount of from about 1 to about 20, from about 2 to about 15, and from about 2 to about 12 weight percent, and wherein the pigment is a cyan pigment, a magenta pigment, a yellow pigment, a red pigment, a blue pigment, or mixtures thereof; and wherein the ink possesses a viscosity of from about 1.5 to about 5 centipoise, and a surface tension of from about 30 to about 55 dynes per centimeter, and which ink further contains ink additives such as for example, those selected from the group consisting of biocides, buffering agents, anti-mold agents, pH adjustment agents, electric conductivity adjustment agents, chelating agents, anti-rusting agents, anti-cockle agents, and stabilizing agents, and which components are selected for example, in an amount of from about 0.01 to about 10, or from about 0.1 to about 5 weight percent. The ink compositions more specifically can contain buffering agents of sodium borate, sodium hydrogen phosphate, sodium dihydrogen phosphate, or mixtures thereof; biocides of DOWICIL 150™, 200™, and 75™, benzoate salts, sorbate salts, or mixtures thereof; pH controlling agents of acids, bases of hydroxides of alkali metals of lithium hydroxide; phosphate salts; carbonate salts; carboxylate salts; sulfite salts; amine salts; amines of diethanolamine, and triethanolamine; and mixtures thereof; anticurl agents of trimethylolpropane, N-acetylethanolamine, N-N-diacetyl piperazine, triethylene glycol, N-(2-aminoethyl) ethanolamine, 1,4-butanediol, N-ethylformamide, 2-methyl-1,5-pentanediol, 1,5-pentanediol, diethylene glycol, 2,2'-oxybisethanol, and mixtures thereof; and/or chelating agents of ethylenediaminetetraacetic acid, and salts thereof; stabilizing agents of polyethylene oxide/bisphenol A polymer; and external salts of quaternary ammonium halide salts of ammonium chloride, ammonium bromide or lithium chloride.

The ink composition may contain up to for example, about 25 percent or more by weight of the colorant. Preferably, the ink jet ink compositions of the present invention contain from about 2 percent to about 20 percent by weight of the colorant, and more preferably from about 2.5 percent to about 15 percent by weight. Other suitable amounts of colorant may be selected. The preferred colorant is a pigment, or pigment particles. Colorant includes dyes, pigments, mixtures thereof, mixtures of pigments, mixtures of dyes, and the like.

In embodiments of the present invention, the colorant for the ink jet ink compositions may be a pigment, a dye, or mixtures thereof, and preferably is a pigment, such as carbon black. Colorant examples include carbon black, cyan, magenta, yellow, red, blue, green, brown, mixtures thereof, and the like. Examples of suitable black colorants include various carbon blacks such as channel black, furnace black, lamp black, and the like, which may be used either as dry powders or in a predispersed form, such as the preferred Levanyl Black A-SF (Bayer), Sunsperse Carbon Black LHD 9303 (Sun Chemicals), other similar carbon black products available from Sun Chemicals, and other similar carbon black products available from Cabot Corporation. Illustrative examples of magenta pigments include 2,9-dimethyl-substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthrathrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of colorants include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF).

Preferably, in embodiments of the present invention when pigments are selected, the pigment particle size is small to enable a stable dispersion of the particles in the presence of the resin emulsion. Preferred particle average diameters are generally from about 0.001 to about 1 micrometers. The pigments may be further processed to obtain a preferred particle size of for example, from about 0.001 to about 1 micron in volume average diameter. The further processing includes the use of a ball mill, a sand mixer, an attritor, an agitator mill, an ultrasonic homogenizer, a microfluidizer, or centrifugation.

The dyes selected may be acid, direct or reactive dyes. Specific examples of dyes include Bernacid Red 2BMN, Pontamine Brilliant Bond Blue A, BASF X-34, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Acid Yellow 17, Acid Red 52, and Direct Red 227, all available from Tricon; Projet Cyan 1, Projet Magenta 1T, and Projet Yellow 1G, all available from Zeneca; mixtures thereof, and the like. Dyes that are invisible to the naked eye but detectable when exposed to radiation outside the visible wavelength range, such as ultraviolet or infrared radiation, such as dansyl-lysine, N-(2-aminoethyl)-4-amino- 3,6-disulfo-1,8-dinaphthalimide dipotassium salt, N-(2-aminopentyl)-4-amino-3,6-disulfo-1,8-dinaphtha-limide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS (available from Leucophor), and the like. Mixtures of dyes and pigments may also be selected.

Furthermore, in embodiments of the present invention, the ink jet ink compositions may include magnetic particles, for example, to enable the use of the ink jet ink compositions in a magnetic ink character reader (MICR) system. Suitable magnetic substances include, but are not limited to needle-shaped magnetic substances, doped magnetic substances and heat-treated magnetic substances. For example, the compositions of the particular magnetic substances may include heat-treated magnetite, co-doped magnetite, needle magnetite and magnetite. Other suitable magnetic substances include, but are not limited to ferromagnetic compounds including hard magnetic particles, soft magnetic particles, or a mixture of hard and soft magnetic particles. The magnetically soft particles can be iron or another high-permeability, low-remanence material, such as iron carbonyl, certain of the ferrites, for example zinc or manganese ferrite, or permalloys. The magnetically hard particles can be iron oxide, other ferrites, for example, barium ferrite, chi-iron carbide, chromium dioxide or alloys of iron oxide and nickel or cobalt. When such magnetic particles are included in the ink jet ink compositions, they may be present in any effective amount, and are preferably of a particle size such that the jetting characteristics of the ink are not adversely affected.

Other components may also be incorporated into the inks of the present invention as indicated hereinbefore. For example, the inks of the present invention may include such additives as biocides, buffering agents, anti-mold agents, pH adjustment agents, electric conductivity adjustment agents, chelating agents, anti-rusting agents, stabilizing agents and the like. These additives may be included in the ink jet inks of the present invention in any effective amount, such as for example from about 0.0001 to about 4.0 percent by weight, and preferably from about 0.01 to about 2.0 percent by weight of the ink.

Examples of buffering agents include, but are not limited to sodium borate, sodium hydrogen phosphate, sodium dihydrogen phosphate, mixtures thereof and the like. Examples of biocides include, but are not limited to Dowicil™, Proxel, benzoate salts, sorbate salts, mixtures thereof, and the like.

Ph controlling agents may also be included in the inks. Examples of such pH controlling agents for invention include, but are not limited to acids, bases, including hydroxides of alkali metals, such as lithium hydroxide, sodium hydroxide and potassium hydroxide; phosphate salts such as potassium dihydrogen phosphate; carbonate salts such as sodium hydrogen carbonate; sulfite salts such as sodium hydrogen sulfite; amine salts; amines, such as diethanolamine and triethanolamine; mixtures thereof and the like. When present, the pH controlling agent is preferably included in an amount of up to about 3 percent by weight, and preferably from about 0.01 to about 1 percent by weight.

Other ink additives may also be selected. For example components such as, trimethylol propane may be added to the ink jet ink compositions, for example, to reduce paper curl or as an anti-cockle agent. Examples of suitable additives are disclosed, for example, in U.S. Pat. No. 4,737,190, the entire disclosure of which is incorporated herein by reference.

The inks of the present invention can be prepared by the simple mixing of the resin, colorant, such as pigment, ink vehicle and known ink additives, such as biocides, humectants, buffers, penetrants, and the like, and more specifically, by dissolving ink additives, such as anticurl agents, in an amount, for example, of from about 0.1 to 10 weight percent, water, cosolvents, such as Sulfolane, in an amount, for example, of from about 15 to about 25 weight percent and agitating to obtain a homogeneous mixture, and which agitating is for an effective period of time, for example from about 5 to about 10 minutes. To the resulting mixture there is added the sulfonated polyester with acrylic acid groups, methacrylic acid groups, or mixtures thereof for example, from about 0.5 to about 5 weight percent of resin, followed by stirring for from about 5 to about 10 minutes, or other effective time period. This resulting mixture can then be added to a stirring pigment, and wherein stirring can be accomplished by any agitation device, such as a stir bar for about 5 to about 10 minutes. The resultant ink can be filtered through a suitable filter, such as a 1 $\mu$m glass fiber filter, primarily to remove contaminants or large particles (>1 $\mu$m) from the ink mixture.

For the final ink jet ink compositions of the present invention, a number of physical properties may be desirable, for example ink compositions for use in ink jet recording processes should have appropriate viscosity, surface tension and pH characteristics, and permit developed images with reduced smear, and excellent optical densities. In the present invention, it is preferred that the ink jet ink composition possess a viscosity as measured with for example a fluid tensiometer of from about 0.5 to about 20 cP at 25° C. Preferably, the ink viscosity is from about 1 to about 15 cP (centipoise), and more preferably from about 1 to about 7 cP. It is also preferred that the ink jet ink composition possess a surface tension of from about 10 to about 75 dynes/cm at 25° C. More preferably, the surface tension of the ink is from about 20 to about 55 dynes/cm, and preferably from about 25 to about 45 dynes/cm. It is also preferred that the ink jet ink composition possess a pH of from about 3 to about 10, and more preferably from about 4 to about 8.

The inks of the present invention possess excellent ink stability, for example they maintain a substantially constant viscosity as measured by a Brookfield Fluid Rheometer, a suitable pH as measured by a pH electrode and meter, and an effective surface tension as measured by a fluid tensiometer. Moreover, the inks do not exhibit visible colorant, or emulsion particle settling behavior for extended time periods, for example over six months, and more specifically, from about six months to about two years.

The substantially constant viscosity, pH, surface tension, and lack of particulate settling is maintained despite stressing the ink by, for example, permitting the ink to remain in a bottle at room temperature, for example about 25° C., then subjecting the ink to heating at about 60° C. (degrees Centigrade) for 24 hours or 50° C. for 30 days; or subjecting the ink to freezing at −30° C. followed by thawing at room temperature. Under these stress conditions, the viscosity of the ink does not substantially increase or decrease more than about 0.5 cPs (centipoise). A substantial viscosity change, for example from 3 centipoise (cPs) to about 4 centipoise, may cause the ink to be nonjettable, and/or may render the ink incapable of passing through the jetting device filter. An adverse change in ink viscosity may result in the lack of refilling ink to the jetting device, and thus subsequent loss of jetting channel refill and drops not being fired from the jetting device. Subjecting the inks to temperatures below about 0 degrees Celsius, such as −40° C., and thereafter thawing the inks, an extreme condition which may occur during transportation of the ink in winter, or cold climates, evidenced no visible ink settling or precipitate of the ink, such as the pigment, the resin emulsion particles, and pigment with other ink components. Visible settling or precipitates, after the ink has remained at 25° C., would cause ink jet nozzle clogging, and therefore, effect the line edge raggedness, optical density, or mottle of the images. Also, the settling of the ink would permit a nonhomogeneous mixture which may also cause storage problems such as in an ink tank containing a wicking device. Further, the inks of the present invention do not require additional special additives, such as the prior art saccharine/polyols, for long shelf stability or excellent jetting performance.

As evidence of the absence of ink interaction, fluid rheology is used with a Rheometrics RSF. The viscosity in centipoise is measured versus a change in shear rate and typically plotted as log of shear rate (sec-1). Inks were measured over a range of log shear rate (sec-1) of 0.5 to 3. The inks of the present invention evidenced no significant viscosity decrease with increasing shear rate, indicating the lack of association of the colorant, especially pigment and resin emulsion particles, and spacing between the resin and pigment. Moreover, as shear rate was decreased from $10^3$ to $10^0$, the ink viscosity followed the same curve as was the situation with regard to the aforementioned shear rate increase, which is a further indication of the absence of association of colorant, and resin emulsion particles in the ink.

The invention will now be described in detail with reference to specific preferred embodiments thereof, it being understood that these examples are intended to be illustrative only. All parts and percentages are by weight unless otherwise indicated.

Preparation of Sulphonated Polyesters
Preparation of Linear Moderately Sulphonated Polyester A:

A linear sulphonated random copolyester resin comprised of on a mol percent of approximately 0.425 terephtalate, 0.075 sodium sulphoisophthalate, 0.450 1,2-propanediol, and 0.050 diethylene glycol was prepared as follows. In a one liter Parr reactor equipped with a bottom drain valve, double turbine agitator, and distillation receiver with a cold water condenser were charged 388 grams of dimethylterephthalate, 104.6 grams of sodium dimethylsulphoisophthalate, 322.6 grams of 1,2-propanediol (1 mole excess of glycols), 48.98 grams of diethylene glycol, (1 mole excess of the glycol) and 0.8 grams of butyltin hydroxide oxide as the catalyst. The reactor was then heated to 165° C. with stirring for 3 hours whereby 120 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 126 grams of distillate in the distillation receiver and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 14 grams of 1,2-propanediol were collected. The reactor was then purged with nitrogen to atmospheric pressure, and the polymer discharged through the bottom drain onto a container cooled with dry ice to yield 460 grams of the 7.5 mol % sulphonated-polyester resin, copoly(1,2-propylene-diethylene)terephthalate-copoly(sodium sulphoisophthalate dicarboxylate). The sulphonated-polyester resin glass transition temperature was measured to be 54.6° C. (onset) utilizing the 910 Differential Scanning Calorimeter available from E.I. DuPont operating at a heating rate of 10° C. per minute. The molecular weights were estimated using a Waters Gel Permeation Chromatography (GPC) system with tetrahydrofuran as the solvent. The number average molecular weight was measured to be 2,340 grams per mole, and the weight average molecular weight was measured and found to be 3,570 grams per mole. This resin, Polymer A, was utilized for the preparation of the maleic acid terminated polyester, MA, (see below) which was then used for Examples I, IV, and V.

Preparation of Linear Low Sulphonated Polyester B:

A linear sulphonated random copolyester resin comprised of on a mol percent of approximately 0.465 terephtalate, 0.035 sodium sulphoisophthalate, 0.475 1,2-propanediol, and 0.025 diethylene glycol was prepared as follows. In a one liter Parr reactor equipped with a bottom drain valve, double turbine agitator, and distillation receiver with a cold water condenser were charged 388 grams of dimethylterephthalate, 44.55 grams of sodium dimethylsulphoisophthalate, 310.94 grams of 1,2-propanediol (1 mole excess of glycols), 22.36 grams of diethylene glycol, (1 mole excess of the glycol) and 0.8 grams of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 122 grams of distillate in the distillation receiver and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the 3.5 mol % sulphonated-polyester resin copoly(1,2-propylene-diethylene)terephthalate-copoly(sodium sulphoisophthalate dicarboxylate). The sulphonated-polyester resin glass transition temperature was measured to be 54.6° C. (onset) utilizing the 910 Differential Scanning Calorimeter available from E.I. DuPont operating at a heating rate of 10° C. per minute. The molecular weights were estimated using a Waters Gel Permeation Chromatography (GPC) system with tetrahydrofuran as the solvent. The polymer number average molecular weight was measured to be 1,500 grams per mole, and the polymer weight average molecular weight was measured to be 3,160 grams per mole. This resin, Polymer B, was utilized for the preparation of the maleic acid terminated polyester, MB, (see below) which was then used for Examples II, III, and VI.

Preparation of the Maleic Acid Terminated Sulphonated Polyester MA:

300 Grams of the base resin sulphonated polyester A, copoly(1,2-propylene-diethylene)terephthalate-copoly (sodium sulpho isophthalate dicarboxylate prepared above), together with 2.5 mol % of maleic anhydride (9 g, 0.0025 m) was formed into a melt at a 150° C. in a one liter Parr reactor equipped with a bottom drain valve, double turbine agitator, and distillation receiver with a cold water condenser. The reaction mixture was stirred for 30 minutes to yield the maleic acid terminated sulphonated polyester, bis(acrylic)-copoly(1,2-propylene-diethylene)terephthalate-copoly(sod ium sulphoisophthalate dicarboxylate), that is Polymer MA. The resin glass transition temperature of this polymer was measured to be 53° C. (onset) utilizing the 910 Differential Scanning Calorimeter available from E.I. DuPont operating at a heating rate of 10° C. per minute. The molecular weights were estimated using a Waters Gel Permeation Chromatography (GPC) system with tetrahydrofuran as the solvent. The number average molecular weight was measured to be 2,490 grams per mole, and the weight average molecular weight was measured to be 3,880 grams per mole.

Preparation of the Maleic Acid Terminated Sulphonated Polyester MB:

300 grams of the base resin sulphonated polyester B, copoly(1,2-propylene-diethylene)terephthalate-copoly (sodium sulpho isophthalate dicarboxylate prepared above), together with 2.5 mol % of maleic anhydride (9 g, 0.0025 m) was formed into a melt at a 150° C. in a one liter Parr reactor equipped with a bottom drain valve, double turbine agitator, and distillation receiver with a cold water condenser. The reaction was stirred for 30 minutes to yield the maleic acid terminated sulphonated polyester, bis(acrylic)-copoly(1,2-propylene-diethylene)terephthalate-copoly(sodium sulpho isophthalate dicarboxylate), that is Polymer MB. The resin glass transition temperature of this polymer MB was measured to be 55° C. (onset) utilizing the 910 Differential Scanning Calorimeter available from E.I. DuPont operating at a heating rate of 10° C. per minute. The molecular weights were estimated using a Waters Gel Permeation Chromatography (GPC) system with tetrahydrofuran as the solvent. The number average molecular weight was measured to be 2,780 grams per mole, and the weight average molecular weight was measured to be 3,910 grams per mole.

Preparation of Acrylic and Methacrylic Copolymers of Sulphonated Polyesters

EXAMPLE 1

Small Scale Synthesis of the ABA Poly(acrylic acid)-copolysulphonated Polyester:

To 50 grams of the maleic acid terminated sulphonated polyester (Polymer MA) in a 250 ml round bottom flask was added 100 mls of THF. The resulting mixture was stirred until dissolved, and 50 g of acrylic acid, 2 wt % (weight percent) of dodecanethiol (2 g) and 1.0 g of Vazo 52 (2,2'-azobis(2,4-dimethylvaleronitrile from DuPont) free radical initiator was added. The solution was refluxed for 4 hours, cooled and precipitated in an excess of hexanes (a mixture of $C_6H_{14}$ alkanes and methylcyclopentane) and dried on a vacuum line. The resin ABA product glass transition temperature was measured to be 40° C. (onset) utilizing the 910 Differential Scanning Calorimeter available from E.I. DuPont operating at a heating rate of 10° C. per minute. The molecular weights were estimated using a Waters Gel Permeation Chromatography (GPC) system using tetrahydrofuran as the solvent. The resin or polymer product number average molecular weight was measured to be 2,520 grams per mole, and the weight average molecular weight was measured to be 4,190 grams per mole. An aqueous dispersion of the polymer suitable for the preparation of inks was prepared by the addition of the ABA copoly(acrylic acid)-co(sulphonated polyester) to hot distilled deionized water yielding submicron particles with a weight average volume particle size of 40 nm as measured on a Nicomp particle analyzer.

EXAMPLE 2

Scale up of the ABA Poly(acrylic acid)-copolysulphonated Polyester:

To 150 grams of the maleic acid terminated sulphonated polyester (Polymer MB) in a one litre round bottom flask was added 500 mls of THF. The mixture was stirred until dissolved, and 150 g of acrylic acid, 2 wt % of dodecanethiol (6 g) and 3.0 g of Vazo 52 (2,2'-Azobis(2,4-dimethylvaleronitrile from E.I. DuPont) free radical initiator was added. The solution was brought to reflux for 4 hours, cooled, diluted an additional 50% with THF and precipitated in to an excess of hexanes (a mixture of $C_6H_{14}$ alkanes and methylcyclopentane), and dried on a vacuum line. The resin ABA product glass transition temperature was measured to be 42° C. (onset) utilizing the 910 Differential Scanning Calorimeter available from E.I. DuPont operating at a heating rate of 10° C. per minute. The molecular weights for the ABA copoly(acrylic acid)-co(sulphonated polyester) polymer were estimated with a Waters Gel Permeation Chromatography (GPC) system using tetrahydrofuran as the solvent. The resin number average molecular weight was measured to be 2,940 grams per mole, and the weight average molecular weight was measured to be 5,080 grams per mole. An aqueous dispersion of the resin suitable for the preparation of inks was prepared by the addition of the copoly(acrylic acid)-co(sulphonated polyester) to hot (80° C.) distilled deionized water throughout yielding submicron particles with a weight average volume particle size of 30 nm as measured on a Nicomp particle analyzer.

EXAMPLE 3

Small Scale Synthesis of the Lower Sulphonated ABA Poly(acrylic acid)-copolysulphonated Polyester:

To 50 grams of the maleic acid terminated sulphonated polyester (Polymer MB) in a 250 ml round bottom flask was added 100 mls of THF. The resulting mixture was stirred until dissolved, and 50 g of acrylic acid, 2 wt % of dodecanethiol (2 g) and 1.0 g of Vazo 52 (2,2'-Azobis(2,4-dimethylvaleronitrile from DuPont) free radical initiator was added. The solution was to refluxed for 4 hours, cooled and precipitated in an excess hexanes (a mixture of $C_6H_{14}$ alkanes and methylcyclopentane), and dried on a vacuum line. The resin ABA product glass transition temperature was measured to be 35° C. (onset) utilizing the 910 Differential Scanning Calorimeter available from E.I. DuPont operating at a heating rate of 10° C. per minute. The molecular weights for the copoly(acrylic acid)-co(sulphonated polyester) polymer were estimated using a Waters Gel Permeation Chromatography (GPC) system using tetrahydrofuran as the solvent. The resin number average molecular weight was measured to be 2,900 grams per mole, and the weight average molecular weight was measured to be 4,870 grams per mole. An aqueous dispersion of the polymer suitable for the preparation of inks was prepared by the addition the copoly(acrylic acid)-co(sulphonated polyester) to hot (80° C.) distilled deionized water yielding submicron resin particles with a weight average volume particle size of 20 nm as measured on a Nicomp particle analyzer.

EXAMPLE 4

Small Scale Synthesis of the ABA Poly(methacrylic acid)-copolysulphonated Polyester:

To 50 grams of the maleic acid terminated sulphonated polyester (Polymer MA) in a 250 ml round bottom flask was added 100 mls of THF. The mixture was stirred until dissolved, and 50 g of methacrylic acid, 2 wt % of dodecanethiol (2 g) and 1.0 g of Vazo 52 (2,2'-azobis(2,4-dimethylvaleronitrile from E.I. DuPont) free radical initiator was added. The solution was refluxed for 4 hours, cooled and precipitated in an excess of hexanes (a mixture of $C_6H_{14}$ alkanes and methylcyclopentane), and dried on a vacuum line. The resin product glass transition temperature was measured to be 25° C. (onset) utilizing the 910 Differential Scanning Calorimeter available from E.I. DuPont operating at a heating rate of 10° C. per minute. The molecular weights for the copoly(methacrylic acid)-co(sulphonated polyester) resin were estimated using a Waters Gel Permeation Chromatography (GPC) system using tetrahydrofuran as the solvent. The resin number average molecular weight was measured to be 2,400 grams per mole, and the weight average molecular weight was measured to be 4,600 grams per mole. An aqueous dispersion of the resin suitable for the preparation of inks was prepared by the addition the copoly (methacrylic acid)-co(sulphonated polyester) to hot (80° C.) distilled deionized water yielding submicron particles with weight average volume particle size of 70 nm as measured on a Nicomp particle analyzer.

EXAMPLE 5

Scale up of the ABA Poly(Methacrylic acid)-copolysulphonated Polyester:

To 150 grams of the maleic acid terminated sulphonated polyester (Polymer MA) in a one litre round bottom flask was added 500 mls of THF. The mixture was stirred until dissolved, and 150 g of methacrylic acid, 2 wt % of dodecanethiol (6 g) and 3.0 g of Vazo 52 (2,2'-azobis(2,4-dimethylvaleronitrile from E.I. DuPont) free radical initiator was added. The solution was brought to reflux for 4 hours, cooled, diluted an additional 50% with THF and precipitated in to an excess of hexanes (a mixture of $C_6H_{14}$ alkanes and methylcyclopentane), and dried on a vacuum line. The resin product glass transition temperature was measured to be 32° C. (onset) utilizing the 910 Differential Scanning Calorimeter available from E.I. DuPont operating at a heating rate of 10° C. per minute. The molecular weights for the copoly (methacrylic acid)-co(sulphonated polyester)polymer were estimated using a Waters Gel Permeation Chromatography (GPC) system using tetrahydrofuran as the solvent. The resin number average molecular weight was measured to be 2,700 grams per mole, and the weight average molecular weight was measured to be 4,550 grams per mole. An aqueous dispersion of the polymer suitable for the preparation of inks was prepared by the addition of the copoly (methacrylic acid)-co(sulphonated polyester) to hot (80° C.) distilled deionized water yielding submicron particles with a weight average volume particle size of 60 nm as measured on a Nicomp particle analyzer.

EXAMPLE 6

Small Scale Synthesis of the Lower Sulphonated ABA Poly(methacrylic acid)-copolysulphonated Polyester:

To 50 grams of the maleic acid terminated sulphonated polyester (Polymer MB) in a 250 ml round bottom flask was added 100 mls of THF. The resulting mixture was stirred until dissolved, and 50 g of methacrylic acid, 2 wt % of dodecanethiol (2 g) and 1.0 g of Vazo 52 (2,2'-azobis(2,4-dimethylvaleronitrile from E.I. DuPont) free radical initiator was added. The solution was brought to reflux for 4 hours, cooled and precipitated in an excess of hexanes (a mixture of $C_6H_{14}$ alkanes and methylcyclopentane), and dried on a vacuum line. The resin glass transition temperature was measured to be 32° C. (onset) utilizing the 910 Differential Scanning Calorimeter available from E.I. DuPont operating at a heating rate of 10° C. per minute. The molecular weights for the copoly(methacrylic acid)-co(sulphonated polyester) polymer were estimated using a Waters Gel Permeation Chromatography (GPC) system using tetrahydrofuran as the solvent. The resin or polymer number average molecular weight was measured to be 2,950 grams per mole, and the weight average molecular weight was measured to be 5,300 grams per mole. An aqueous dispersion of the polymer suitable for the preparation of inks was prepared by the addition of the copoly(methacrylic acid)-co(sulphonated polyester) to hot (80° C.) distilled deionized water yielding submicron particles with a weight average volume particle size of 110 nm as measured on a Nicomp particle analyzer.

PREPARATION OF INKS

Control Ink (no sulphonated polyester resin):

A black colored ink jet ink composition was prepared by adding to 52.0 g of deionized water, while continuously stirring, 10 g of ethyleneglycol, 10 g of diethyleneglycol and 27.9 g of the CAB-O-JET 300 carbon black dispersion, available from Cabot Corporation as a dispersion containing 16.2 weight percent of carbon black. A 40% by weight potassium hydroxide solution was added to adjust the pH of the mixture to 7.3. The resulting ink, containing 4.5% by weight of carbon black in the glycol-water mixture, was filtered through a 1 micron glass fiber filter. The physical properties and print quality performance of the filtered ink are provided in Table 1.

Control Ink, Uncapped Resin (Linear Sulphonated Polyester B):

A black colored ink jet ink composition was prepared by first dissolving 2 g of the linear sulphonated polyester resin B, prepared as described herein, in 51.0 g of deionized water. The mixture was gently stirred with a magnetic stirrer on a hot plate at a temperature of 70–80 degree C for a period of 30 minutes. The resin solution was then slowly cooled to room temperature, about 25 degrees Centigrade. While continuously stirring, 10 grams of ethyleneglycol, 10 grams of diethyleneglycol and 27.9 g of the CAB-0-JET 300 carbon black dispersion, available from Cabot Corporation as a dispersion containing 16.2 weight percent of carbon black, were added to the resin solution. A 0.05g 40% by weight potassium hydroxide solution was then to adjust the pH of the mixture to 7.8. The resulting ink, containing 4.5% by weight of carbon black in the above glycol-water-resin mixture, was filtered through a 1 micron glass fiber filter. The physical properties of the filtered ink are provided in Table 1. This ink could not be jetted reliably primarily because of the presence of large aggregates present, on an HP 1600C printer.

INK EXAMPLE 1

A black colored ink jet ink composition was prepared by first dissolving 1 g of the ABA sulforated polyester resin prepared in Example 1 in 51.0 g of deionized water. The mixture was gently stirred with a magnetic stirrer on a hot plate at a temperature of 70–80 degree C for a period of 30 minutes. The resin solution was then slowly cooled to room temperature. While continuously stirring, 10 g of ethyleneglycol, 10 g of diethyleneglycol and 27.9 g of the CAB-0-JET 300 carbon black dispersion, available from Cabot Corporation as a dispersion containing 16.2 weight percent of carbon black, were added to the resin solution. A 0.25 g 40% by weight potassium hydroxide solution was added to adjust the pH of the mixture to 7.3. The resulting ink, containing 4.5% by weight of carbon black in the above glycol-water-resin mixture, was filtered through a 1 micron glass fiber filter. The physical properties and print quality performance of the filtered ink are given in Table 1.

INK EXAMPLE 2

A black colored ink jet ink composition was prepared by first dissolving 2 g of the resin prepared in Example 1 in 50.0 g of deionized water. The mixture was gently stirred with a magnetic stirrer on a hot plate at a temperature of 70–80 degree C for a period of 30 minutes. The resin solution was then slowly cooled to room temperature about 25° C. throughout. While continuously stirring, 10 g of ethyleneglycol, 10 g of diethyleneglycol and 27.9 g of the CAB-O-JET 300 carbon black dispersion, available from Cabot Corporation as a dispersion containing 16.2 weight percent of carbon black, were added to the resin solution. A 0.4 g 40% by weight potassium hydroxide solution was added to adjust the pH of the mixture to 7.2. The resulting ink, containing 4.5 percent by weight of carbon black in 95.5 percent of the glycol-water-resin mixture, was filtered through a 1 micron glass fiber filter. The physical properties and print quality performance of the filtered ink are given in Table 1.

EVALUATIONS

The properties of the above ink compositions were evaluated in the following manner:

A) Physical Properties:

The viscosity of the ink was measured at 25° C. using a Brookfield Model DV-11 viscometer.

The surface tension of the ink was measured at 25° C. using a Kruss Model K10T plate tensiometer.

The pH was measured at 25° C. using a Corning Model 345 pH meter.

B) Smear resistance:

The images were placed in an ink jet printer HP850C (Hewlett Packard). After an image was printed, the image was allowed to stand, or remain at room temperature for 24 hours prior to evaluation. The optical density of the solid area was measured prior to smear testing using a densitometer (Macbeth TR927). The images were printed on several media such as Xerox Courtland 4024DP paper and Image Series LX paper. A clean sheet of the matching paper was placed on top of the solid area image. Using a rub tester (Manufactured by Testing Machines Inc.), a 4 pound weight was placed on top of the covered image. At a speed of 85 rubs per minute, the image was subjected to 50 rubs at 25° C. and 50 percent RH. The area adjacent to the solid area image was measured using the densitometer.

C) Optical Density:

An image was printed by an ink jet printer, HP855C on each of the following papers: Xerox Courtland 4024DP and Images Series LX. The optical density of the printed image was measured by Macbeth TR927 densitometer.

D) Leading Edge Delition (LED):

The jetting performance of the inks was evaluated by measuring the number of drops missing when printing is resumed after 0, 5, and 10 seconds of idle time. No apparent print quality defects are seen when less than 2 drops are missing after a idle time of 10 seconds.

TABLE 1

Physical Properties Measured at 250° C.

| Sample # Properties | Physical Properties and pH | | | Print Quality Data | | |
|---|---|---|---|---|---|---|
| | Viscosity cPs | Surface Tension D/cm | pH | OD[1] | Smear Ratio | LED (10 s delay) |
| Control No resin | 2.16 | 63.5 | 7.3 | 1.52 | 0.13 | 5 |
| Control Uncapped Resin | 2.30 | 50.7 | 7.8 | N/A | N/A | >5 Very Poor Jetting |
| 1 | 2.59 | 52.6 | 7.2 | 1.44 | 0.09 | 2 |
| 2 | 3.12 | 50.4 | 7.3 | 1.29 | 0.03 | 1 |
| HP 1600C Black Ink | 2.80 | 49.0 | 7.9 | 1.54 | 0.06 | 1 |

[1]OD on Xerox Images LX paper.

Particularly, excellent performance with the ink of the present invention can be obtained with N-methyl-2-pyrrolidinone and cyclohexyl-2-pyrrolidinone as cosolvents.

An objective for the inks is to reduce the smear ratio (<0.06) for example to reduce the OD of the smeared-images on plain paper without sacrificing the jetting performance. The jetting performance is monitored by the LED value. In ink Example 2, the ink with 2% resin provides a lower smear ratio than the control ink without the resin. The control ink with the uncapped no acrylic acid or methacrylic acid resin, could not be jetted properly or has a very high LED value. An advantage for the invention ink is that the ink can be prepared by a simple mixing process, for example no milling is required because of the higher solubility of the resin as compared with an uncapped resin, and there is an improved smear resistance on plain paper with the invention inks.

Other modifications of the present invention may occur to those skilled in the art subsequent to a review of the present application and these modifications, including equivalents thereof, are intended to be included within the scope of the present invention.

What is claimed is:

1. An ink jet ink composition comprised of (a) an ink vehicle, (b) a resin of a sulfonated polyester terminated with acrylic or methacrylic acid groups, and (c) colorant, and wherein said resin glass transition temperature (Tg) is from about 0° C. to about 70° C.

2. An ink composition in accordance with claim 1 wherein the colorant is a pigment.

3. An ink composition in accordance with claim 1 wherein the colorant is a dye.

4. An ink composition in accordance with claim 1 wherein the resin $M_w$ is from about 2,000 to about 10,000 daltons, the resin $M_n$ is from about 1,500 daltons to about 7,000 daltons, and the resin Tg is from about 0 to about 70° C.

5. An ink composition in accordance with claim 1 wherein the resin $M_w$ is from about 2,500 to about 7,000 daltons, the resin $M_n$ is from about 2,000 to about 5,000 daltons, and the resin Tg is from about 30 to about 60 degrees Centigrade.

6. An ink composition in accordance with claim 1 wherein the resin is a diblock copolymer of copoly(1,2-propylene-diethylene)terephthalate-copoly(sodium sulphoisophthalate dicarboxylate)-copolyacrylic acid or copolymethacrylic acid-copoly(1,2-propylene-diethylene)terephthalate-copoly (sodium sulphoisophthalate dicarboxylate)-copolyacrylic acid each with a degree of sulphonation of from about 2.5 to about 10 mol percent based on the repeat unit of the sulphonated polyester.

7. An ink composition in accordance with claim 1 wherein the resin is copolyacrylicacidcopoly(1,2-propylene-diethylene)terephthalate-copoly(sodium sulphoisophthalate dicarboxylate)-copolyacrylic acid or copolymethacrylic acid copoly(1,2-propylene-diethylene)terephthalate-copoly (sodium sulphoisophthalate dicarboxylate)-copolymethacrylic acid each with a number average molecular weight of from about 1,500 to about 7,000 daltons and a weight average molecular weight from about 2,000 to about 10,000 daltons, a resin glass transition of from about 10 to about 70° C., and which resin possesses a degree of sulphonation between about 2.5 and 10 mol percent based on the repeat unit of the polymer.

8. An ink composition in accordance with claim 1 wherein the volume average resin size is from about 0.025 microns to about 2 microns.

9. An ink composition in accordance with claim 1 wherein the ink vehicle is selected from the group consisting of water, ethylene glycol, propylene glycol, diethylene glycol, triethylene glycol, thioglycol, glycerine, dipropylene glycol, polyethylene glycol, and polypropylene glycol; amides of urea and substituted ureas; ethers of ethylene glycolmonomethyl ether, ethylene glycolmonoethyl ether, diethylene glycolmonomethyl ether, diethylene glycolmonoethyl ether, diethylene glycolmonobutyl ether, propylene glycolmonomethyl ether, propylene glycolmonomethyl ether, propylene glycolmonobutyl ether, triethylene glycol ether, tripropylene glycol monomethyl ether; carboxylic acids and their salts; esters; alcohols of ethyl alcohol, isopropyl alcohol, butyl alcohol, and benzyl alcohol; organosulfides, organosulfoxides, sulfones, alcohol derivatives, carbitol, butyl carbitol, cellusolve, ether derivatives, amino alcohols, ketones, 1,3-dimethylimidizalidinone, N-methyl-2-pyrrolidinone, 2-pyrrolidone, cyclohexyl-pyrrolidone, hydroxyethers, amides, sulfoxides, lactones; and mixtures thereof.

10. An ink composition in accordance with claim 1 wherein the colorant is present in an amount of from about 1 to about 15 weight percent.

11. An ink composition in accordance with claim 1 wherein the colorant is carbon black.

12. An ink composition in accordance with claim 11 wherein the carbon black is dispersed by an ionic component, or a polymeric dispersant, or the carbon black is self dispersing by the covalently binding of suspending groups to the carbon black surface.

13. An ink composition in accordance with claim 1 wherein the colorant is a cyan pigment, a magenta pigment, a yellow pigment, a red pigment, a blue pigment, dyes thereof, or mixtures thereof.

14. An ink composition in accordance with claim 1 with a viscosity of from about 1.5 to about 5 centipoise, and a surface tension of from about 30 to about 55 dynes per centimeter.

15. An ink composition in accordance with claim 1 further containing ink additives.

16. An ink composition in accordance with claim 15 wherein the ink additives are selected from the group consisting of biocides, buffering agents, anti-mold agents, pH adjustment agents, electric conductivity adjustment agents, chelating agents, anti-rusting agents, anti-cockle agents, and stabilizing agents, and which components are each selected in an amount of from about 0.01 to about 10 weight percent.

17. An ink composition in accordance with claim 16 wherein said buffering agents are sodium borate, sodium hydrogen phosphate, sodium dihydrogen phosphate, or mixtures thereof; said biocides are benzoate salts, sorbate salts, or mixtures thereof; said pH controlling agents are acids, bases of alkali metal hydroxide; phosphate salts; carbonate salts; carboxylate salts; sulfite salts; amine salts; amines of diethanolamine, and triethanolamine, and mixtures thereof; said anticurl agents are trimethylolpropane, N-acetylethanolamine, N-N-diacetyl piperazine, triethylene glycol, N-(2-aminoethyl) ethanolamine, 1,4-butanediol, N-ethylformamide, 2-methyl-1,5-pentanediol, 1,5-pentanediol, diethylene glycol, 2,2'-oxybisethanol, and mixtures thereof; said chelating agents are ethylenediaminetetraacetic acid, and salts thereof; said stabilizing agents are polyethylene oxide/bisphenol A polymer, or external salts of quaternary ammonium halide salts of ammonium chloride, ammonium bromide or lithium chloride.

18. A process for the preparation of the ink compositions of claim 1 which comprises the mixing of said resin, colorant, and vehicle.

19. An ink jet recording process comprising ejecting in the form of ink droplets the ink of claim 1 from an orifice in accordance with a recording signal to form an image on a recording medium.

20. A process in accordance with claim 19 further comprising fixing said image on said recording medium.

21. A process in accordance with claim 20 wherein said fixing is by air drying, heat drying, microwave drying, vacuum drying, radiant fusing, or pressure fusing said image onto said recording medium.

22. An ink in accordance with claim 1 wherein the resin is present in an amount of from about 1 to about 5 weight percent or parts, the vehicle is present in an amount of from about 80 to about 90 weight percent or parts, and the colorant is present in an amount of from about 5 to about 15 weight percent, and subject to the provision that the total of said ink components is about 100 percent.

23. An ink jet ink comprised of a vehicle, a sulphonated polyester with acrylic acid groups, methacrylic acid groups, or mixtures thereof, and a colorant, wherein said sulphonated polyester glass transition temperature (Tg) is from about 0° C. to about 70° C.

24. An ink composition in accordance with claim 23 wherein the resin is a triblock polymer of copolyacrylic acid copoly(1,2-propylene-diethylene)terephthalate-copoly (sodium sulphoisophthalate dicarboxylate)-copolyacrylic acid or copolymethacrylic acid copoly(1,2-propylene-diethylene)terephthalate-copoly(sodium sulphoisophthalate dicarboxylate)-copolymethacrylic acid with a degree of sulphonation of from about 2.5 to about 10 mol percent based on the repeat unit of the sulphonated polyester.

25. An ink jet ink composition comprised of an ink vehicle, a resin of a sulfonated polyester, and which polyester is terminated with acrylic acid groups and a colorant, wherein said resin glass transition temperature (Tg) is from about 0° C. to about 70° C.

26. An ink in accordance with claim 25 wherein said resin Tg is from about 30° C. to about 60° C.

27. An ink jet ink composition comprised of an ink vehicle, a resin of a sulfonated polyester, and which polyester is terminated with methacrylic acid groups and a colorant, wherein said resin glass transition temperature (Tg) is from about 0° C. to about 70° C.

28. An ink in accordance with claim 27 wherein said resin $M_w$, weight average molecular weight, is from about 2,000 to about 10,000 daltons and said resin $M_n$, number average molecular weight, is from about 1,500 to about 7,000 daltons.

29. An ink jet ink composition consisting essentially of (a) an ink vehicle, (b) a resin of a sulfonated polyester terminated with acrylic or methacrylic acid groups, and (c) colorant, and wherein said resin glass transition temperature (Tg) is from about 0° C. to about 70° C.

30. An ink jet ink composition consisting essentially of (a) an ink vehicle, (b) a resin of a sulfonated polyester terminated with acrylic or methacrylic acid groups, and (c) colorant, and wherein said resin glass transition temperature (Tg) is from about 0° C. to about 70° C., and wherein said resin weight average molecular weight $M_w$ is from about 2,000 to about 10,000 daltons, and said resin number average molecular weight $M_n$ is from about 1,500 to about 7,000 daltons.

* * * * *